M. E. CUMMINGS.
RIBBON MEASURING AND MARKING MACHINE.
APPLICATION FILED JULY 29, 1911.
1,054,090.
Patented Feb. 25, 1913.
2 SHEETS—SHEET 2.
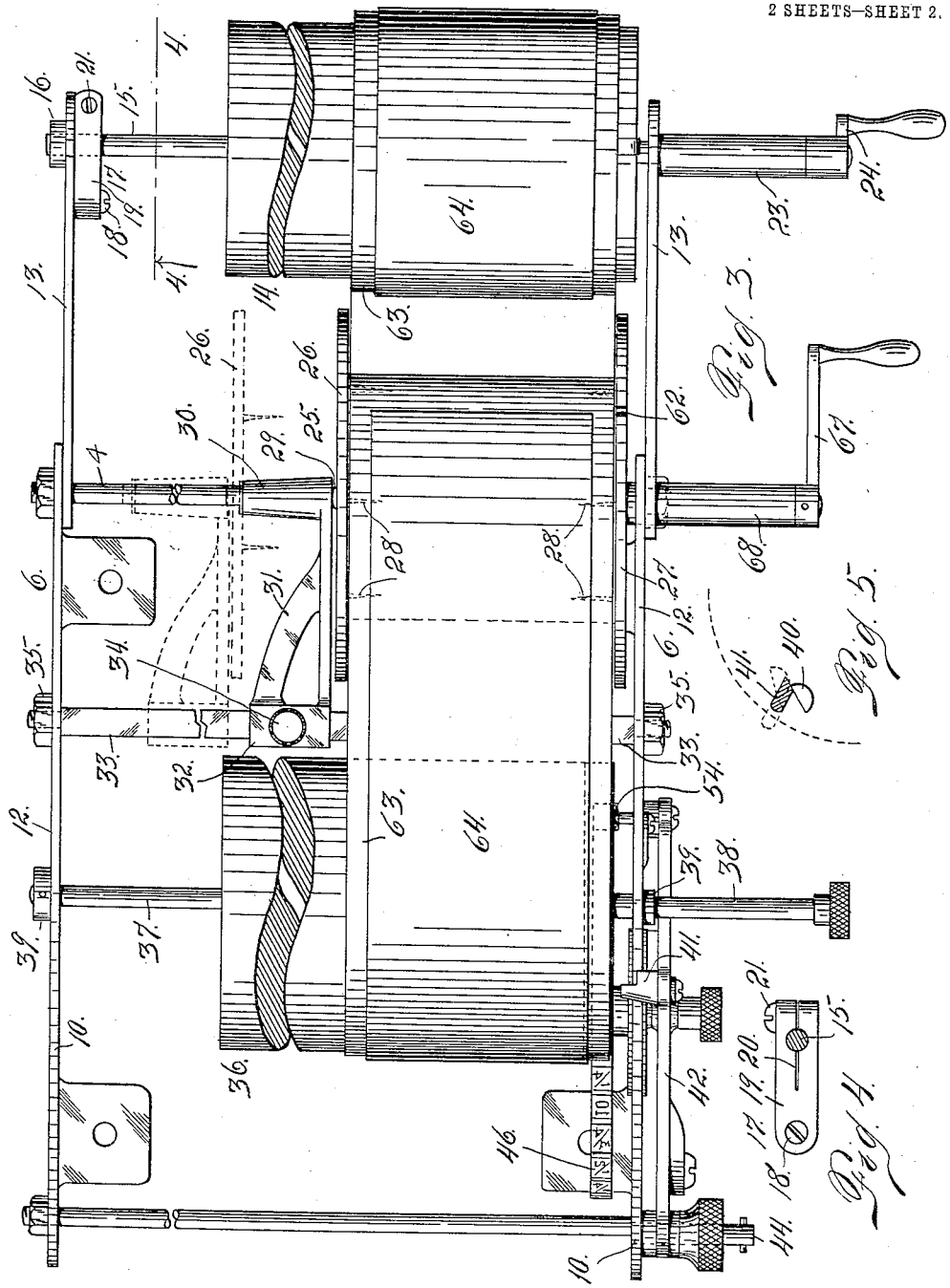
Witnesses
C. H. Roessner.
Otto E. Hoddick.
Inventor
Martin E. Cummings.
By A. J. O'Brien
Attorney

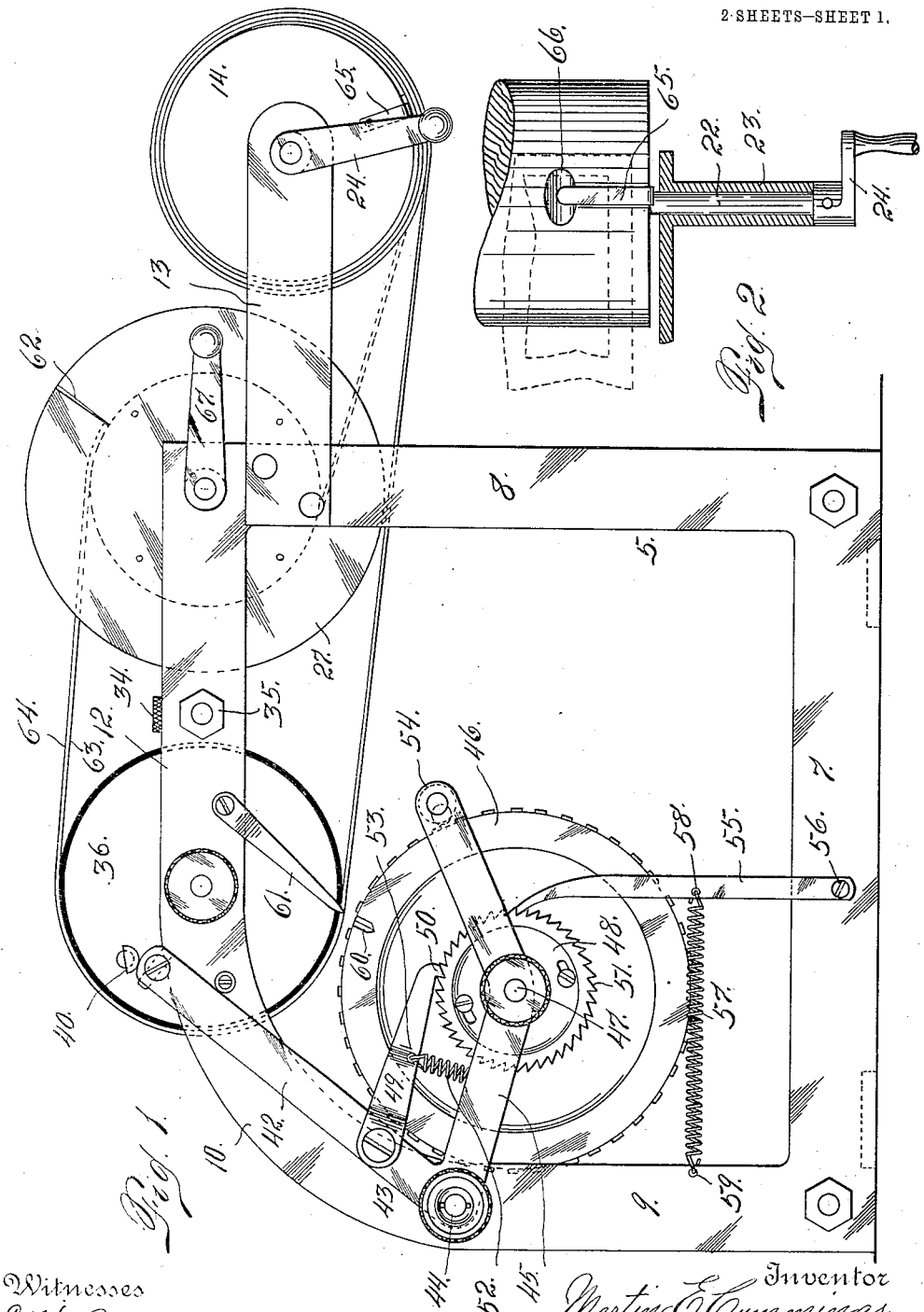

UNITED STATES PATENT OFFICE.

MARTIN E. CUMMINGS, OF DENVER, COLORADO, ASSIGNOR OF ONE-HALF TO JOHN B. OLINGER, OF DENVER, COLORADO.

RIBBON MEASURING AND MARKING MACHINE.

1,054,090. Specification of Letters Patent. Patented Feb. 25, 1913.

Application filed July 29, 1911. Serial No. 641,304.

*To all whom it may concern:*

Be it known that I, MARTIN E. CUMMINGS, a citizen of the United States, residing in the city and county of Denver and State of Colorado, have invented certain new and useful Improvements in Ribbon Measuring and Marking Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in machines for measuring ribbon put up in bolts, the graduations indicating the measurements being indicated on the paper which is rolled with the ribbon upon the bolt.

My improved machine is equipped with a roll which is employed to remove the ribbon from the bolt, all of which being wound upon the said roll, the ribbon is then passed around a measuring roll and caused to engage the same in frictional relation, and its free extremity being fastened to the spool. The spool is then turned, whereby the ribbon is wound from the receiving roll upon the spool, the measuring roll being intermediately located, provision being made for actuating a typed disk, whereby the proper measurement is indicated upon the paper beyond the ribbon for each rotation of the measuring roll. In my improved construction, as illustrated in the drawing, the mechanism is constructed and arranged to measure the ribbon by indicating quarter yards on the paper adjacent the ribbon, since it is considered that this measurement will be all that is necessary for practical purposes.

Having briefly outlined my improved construction, I will proceed to describe the same in detail, reference being made to the accompanying drawing, in which is illustrated an embodiment thereof.

In this drawing: Figure 1 is a side elevation of my improved machine. Fig. 2 is a fragmentary top plan view of the receiving roll, the bearing through which one extremity of the spindle is passed being indicated in section. Fig. 3 is a top plan view of Fig. 1. Fig. 4 is a section taken on the line 4—4, Fig. 3, illustrating the tension bearing for the receiving roll spindle. Fig. 5 is a detail view, illustrating the manner in which the measuring roll actuates the marking disk and its connections, the lug formed on a part of the marking mechanism being indicated in section.

The same reference characters indicate the same parts in all the views.

Let the numeral 5 designate a stationary frame, which may be mounted upon any suitable support not shown. As illustrated in the drawing, this framework consists of two side members 6, each consisting of a base part 7, an upright rear part 8, and a forward part 9 which is curved at its upper extremity as shown at 10 and merges into a top part 12. To the upright parts 8, near the top, are secured rearwardly extending arms 13, in the outer extremities of which is journaled a roll 14, one extremity 15 of the roll spindle engaging an opening formed in one of the arms 13, a bearing disk 16 being applied to the spindle end beyond the arm 13, while the tension clamp 17 is applied to the spindle adjacent the inside of the said arm, the said clamp being secured to the arm by a fastening screw 18. This clamp is simply a metal block 19, split as shown at 20 and perforated through its split portion to receive the spindle, the split of the said block giving the members on opposite sides thereof sufficient yielding capacity for tension purposes, a screw 21 being passed through the split portion of the block and at right angles to the plane of the split for the purpose of regulating the tension on the said spindle. The opposite spindle extremity 22 engages a relatively long bearing 23 extending beyond the arm 13 through which the spindle passes, the long bearing 23 as illustrated in the drawing, being formed integral with the arm 13. (See Fig. 2.)

On the outer extremity of the spindle member 22 is secured a hand crank 24, which is employed in transferring the ribbon from the spool 25 to the said roll, which I will term the receiving roll. The spool 25 is composed of two independent heads or disks 26 and 27, each of which is equipped with brads 28 adapted to enter the ends of the paper cylinder upon which the ribbon is wound, the disk 26 having a spindle 29 journaled in a bearing 30, mounted on an arm 31, terminating in a bearing 32, slidable on a bar 33, polygonal in cross-section, the opening through the bearing 32 being of counterpart shape and equipped with a set screw 34 for securing the slidably adustable arm in any desired position of adjustment. This adjustment is made necessary from the fact that the ribbon constituting the bolts varies in width. The machine is made of sufficient width to compensate for the varying sizes of the bolts. The bearing 33 is mounted on the framework of the machine, extending from one arm member 6 to the other, its extremities passing through both frame members and being secured by fastening nuts 35. On the drawing, the spindle 29 happens to be shown above and directly in line with the tie bolt 4, but it is thought that the arrangement of the parts will be evident in view of the above description.

At the opposite end of the machine from the receiving roll 14, is located a measuring roll 36, having spindle extremities 37 and 38 journaled in the opposite side members 6 of the frame, the said members being reinforced beyond the top parts 12 thereof, as shown at 39, in order to give the spindle extremities the necessary bearing for the purpose. The circumference of this measuring roll is exactly equal to the distance between the measuring marks upon the paper accompanying the ribbon. In the present case, the roll is nine inches in circumference, since it is desired to mark the paper adjacent the ribbon for every quarter yard of ribbon which engages the measuring roll. One extremity of the measuring roll is equipped with a lug 40 adapted to act upon a projection 41 formed on an arm 42 of a bell crank lever 43, which is fulcrumed on the frame at 44, the opposite arm 45 of the said lever, carrying a marking wheel 46, fast on a spindle 47, journaled on the said arm 45 of the bell crank lever, a ratchet disk 48 being also fast on the said spindle adjacent the marking wheel, and whose teeth are numbered to harmonize with the markings formed on the periphery of the wheel, the said markings being consecutively arranged to indicate yards and fractions of yards, from ¼ which is the first marking applied, to 10 which indicates the number of yards of ribbon in the bolt, the paper with which the ribbon is wound being marked to indicate quarter yards as heretofore explained.

Pivotally mounted on the arm 42 of the bell crank lever is a pawl 49, having a toothed extremity 50 adapted to engage the teeth 51 of the ratchet wheel, the said pawl being normally held in engagement with the teeth of the wheel by a spiral spring 52, one extremity of which is secured to the arm 45 of the bell crank lever, while the other extremity is secured to the pawl as shown at 53.

At the outer extremity of the arm 45 of the bell crank lever beyond the journal of the marking and ratchet wheels, is located a small inking roll 54 adapted to engage the periphery of the marking wheel, whereby the type or embossed characters applied thereto are properly inked for marking purposes.

The ratchet wheel 48 is further engaged by an upright pawl 55, its lower extremity being pivoted on the frame as shown at 56, while its upper extremity engages the teeth of the ratchet wheel. Its pawl 55 is held in operative engagement with the ratchet wheel by means of a spiral spring 57, one extremity of the spring being connected with the pawl as shown at 58, while the opposite extremity is connected with the frame, as shown at 59.

From the foregoing description the use and operation of my improved machine will be readily understood.

In commencing the operation, the marking wheel 46 should be so set that the mark 60 thereon shall be directly opposite a pointer 61 carried by the top part 12 of one of the frame members 6, while the free extremity of the ribbon should be secured to the ribbon spool at a mark 62 on the disk 26 of the spool, the said slot being located at the top and in the upright position. The distance from the extremity of the pointer 61 to the free extremity of the ribbon will then be just nine inches or one-quarter of a yard. In this event the measuring roll should be so adjusted that the actuating lug 40 is just out of engagement and past the projection 41 of the bell crank lever. Then as soon as the movement of the measuring roll commences, the bell crank lever and its attachments will be actuated to raise the marking wheel into engagement with the paper 63, adjacent one edge of the ribbon 64. However, in beginning the operation, the ribbon of the bolt must first be removed from the spool 25 and transferred to the receiving spool 14. This is done by connecting the free extremity of the ribbon and the paper strip accompanying the same, with the receiving roll, the roll for this purpose being equipped with a leaf spring 65 under which the extremity of the ribbon and its accompanying paper strip may be slipped, the roll being provided with a shallow recess 66 underneath the free extremity of the spring 65 to facilitate the introduction of the ribbon and paper strip. The receiving roll is then turned in a direction to remove the ribbon from the spool 25, and after all of the ribbon has been wound from this said spool, leaving only the core upon which the ribbon was originally wound, this core being held between the two disks of the spool. The free extremity of the ribbon is passed underneath the spool, up around the measuring roll, and forwardly above the same, its free extremity being secured to the core of the ribbon bolt carried by the spool 25 as aforesaid. Then assuming that the marking wheel and the spool are properly adjusted, the ribbon may be wound from the receiving roll to the spool 25, the spool being turned by the aid of a hand crank 67 with which the outer extremity of the spindle of the outermost disk is provided, the said spindle engaging a relatively long bearing 68. Now, as the spool 25 is turned and the ribbon drawn from the receiving roll and rewound on the spool, the ribbon passes underneath the measuring roll and the margin of the paper 54 protruding beyond the ribbon, is located directly above the periphery of the marking wheel. The friction of the ribbon and the paper on the measuring roll actuates the latter, and every time the last named roll makes a complete rotation, the bell crank lever 43 is moved on its fulcrum, whereby the marking wheel is lifted far enough to bring its marking periphery into engagement with the margin of the ribbon paper 54, whereby a mark is made on the paper to indicate the length of the ribbon which has already been wound on the spool including the part between the spool and the marking character of the disk last employed. This operation is continued until the paper accompanying the entire bolt of ribbon has been marked to indicate its length, and whereby in removing the ribbon from the bolt it may always be known the exact length of ribbon unwound, that is to say, within a quarter of a yard, since the markings as heretofore stated, are not made to indicate lengths of less than one-quarter yard.

In further explanation of the operation of the machine, it should be stated that every time the bell crank lever is actuating to raise the marking wheel, the ratchet wheel is lifted sufficiently to cause the pawl 55 to engage an additional tooth. In other words the lifting of the marking wheel imparts a partial rotary movement to the ratchet wheel in an arc struck out of the center of the fulcrum 44 of the bell crank lever. Then as soon as the lug 40 of the measuring roll is disengaged from the projection 41 of the bell crank lever, the said lever influenced by the weight of the marking wheel and its own gravity, falls downwardly to its original position, whereby the pawl 65 acts to impart a partial rotary movement to the ratchet and marking wheels, the said movement being measured by one tooth of the ratchet wheel and a space on the periphery of the marking wheel equal to the distance between any two marking characters thereon. In this way the movement of the marking wheel is accurately controlled, since the teeth of the ratchet wheel are numbered and arranged in exact harmony with the series of characters formed on the periphery of the marking disk.

Having thus described my invention, what I claim is:

1. The combination with a suitable frame, of a spool adapted to support a bolt of ribbon and paper journaled thereon having independent heads, one of which is adjustable in the direction of its axis to accommodate itself to ribbon bolts of varying width, a receiving roll journaled on the frame, adjustable tension means for regulating the rotation of the said roll, a measuring roll also journaled on the frame and which the ribbon and paper engage as they are wound from the receiving roll to the spool, and means coöperating with the measuring roll and actuated by the latter for marking the paper adjacent the measured ribbon, substantially as described.

2. The combination with a suitable frame, of a spool, a receiving roll, and a measuring roll all journaled on the frame, the receiving roll being arranged to receive the ribbon as it is wound from the bolt carried by the spool, the measuring roll being so arranged that it is engaged by the strip composed of ribbon and paper as the latter is wound from the receiving roll to the spool, and means for marking the paper adjacent the ribbon strip, comprising a measuring wheel, whose periphery is provided with characters arranged to mark the paper carried by the ribbon as the paper and ribbon are wound upon the spool, a bell crank lever fulcrumed on the frame, the measuring wheel being journaled on one arm of the said lever, and a ratchet wheel connected to rotate with the measuring wheel and having teeth of the same number and arranged to harmonize with the characters formed on the periphery of the measuring wheel, a spring actuated pawl engaging the ratchet wheel, and coöperating to regulate the rotary action of the measuring wheel.

3. The combination with a suitable frame, of a spool adapted to support a bolt of ribbon and paper, a receiving roll, and a measuring roll all journaled on the frame, the receiving roll being arranged to receive the ribbon as it is wound from the bolt carried by the spool, the measuring roll being so arranged that it is engaged by the strip composed of ribbon and paper as the latter is wound from the receiving roll to the spool, and means for marking the paper adjacent the ribbon strip, comprising a measuring wheel, whose periphery is provided with characters arranged to mark the paper carried by the ribbon as the paper and ribbon are wound upon the spool, a bell crank lever fulcrumed on the frame, the measuring wheel being journaled on one arm of the said lever, the said arm also carrying an inking roll arranged to engage the marking periphery of the wheel, and a ratchet wheel connected to rotate with the measuring wheel and having teeth numbered and arranged to harmonize with the characters formed on the periphery of the measuring wheel, a spring actuated pawl engaging the ratchet wheel, and coöperating to regulate the rotary action of the measuring wheel, substantially as described.

4. The combination with a suitable frame, of a spool adapted to support a bolt of ribbon and paper journaled thereon, a rod of polygonal shape mounted upon the said frame, and an arm slidable upon said rod and rotatably supporting one head of said spool, a receiving roll journaled on the frame, adjustable tension means for regulating the rotation of said roll, a measuring roll also journaled on the frame and which the ribbon engages as it is wound from the receiving roll to the spool, and means coöperating with the measuring roll and actuated by the latter for marking the paper adjacent the measured ribbon.

In testimony whereof I affix my signature in presence of two witnesses.

MARTIN E. CUMMINGS.

Witnesses:
  CLORA E. BRADEN,
  F. E. BOWEN.

---

Copies of this patent may be obtained for five cents each, by addressing the "Commissioner of Patents, Washington, D. C."